Jan. 26, 1954

W. P. ROBBINS 2,667,344

ACCELERATION STABILIZED SYNCHRONIZER

Filed July 2, 1951

2 Sheets-Sheet 1

INVENTOR
WILLIAM P. ROBBINS
BY Godfrey B. Spein
ATTORNEY

Jan. 26, 1954   W. P. ROBBINS   2,667,344
ACCELERATION STABILIZED SYNCHRONIZER
Filed July 2, 1951   2 Sheets-Sheet 2

INVENTOR
WILLIAM P. ROBBINS
BY
ATTORNEY

Patented Jan. 26, 1954

2,667,344

UNITED STATES PATENT OFFICE 2,667,344

ACCELERATION STABILIZED SYNCHRONIZER

William P. Robbins, Paterson, N. J., assignor to Curtiss-Wright Corporation, a corporation of Delaware Application July 2, 1951, Serial No. 234,888

14 Claims. (Cl. 264—1)

This invention relates to speed control mechanisms for prime movers and more particularly to an acceleration stabilized governing system of essentially mechanical character which can apply stiff speed control to one or more prime movers without the interposition of complex servo mechanisms. An outstanding feature of the invention is its ability to furnish direct control power for operating prime mover control devices such as fuel valves, controllable driven loads, and the like. A further feature of the invention is the positive means for obtaining acceleration stabilization.

While the prior art shows acceleration sensitive governing systems, droop stabilized governors and various other devices and systems for controlling the speed of power plants, these prior arrangements usually depend upon speed sensing devices whose output signals are amplified and modified by hydraulic, electrical, electronic or mechanical means whereby an eventual signal is developed which may exert speed controlling effects upon the prime mover or some portion thereof to afford speed control. Benefits in the form of simplification may be secured by eliminating these transmission or amplifying devices to afford powerful and precise direct speed control. By utilizing direct and positive mechanical control devices fallibility of and time lags in a control system are minimized and further, specialized knowledge in the service and maintenance of the servo devices is eliminated whereby the dependability of the prime mover control system is enhanced.

In the embodiments of the invention chosen for illustration, geared mechanical differentials provide the key elements by which control effects are secured, but it is to be realized that other devices than geared differentials may be utilized in the system without departing from the spirit or scope of the invention.

Figure 1:
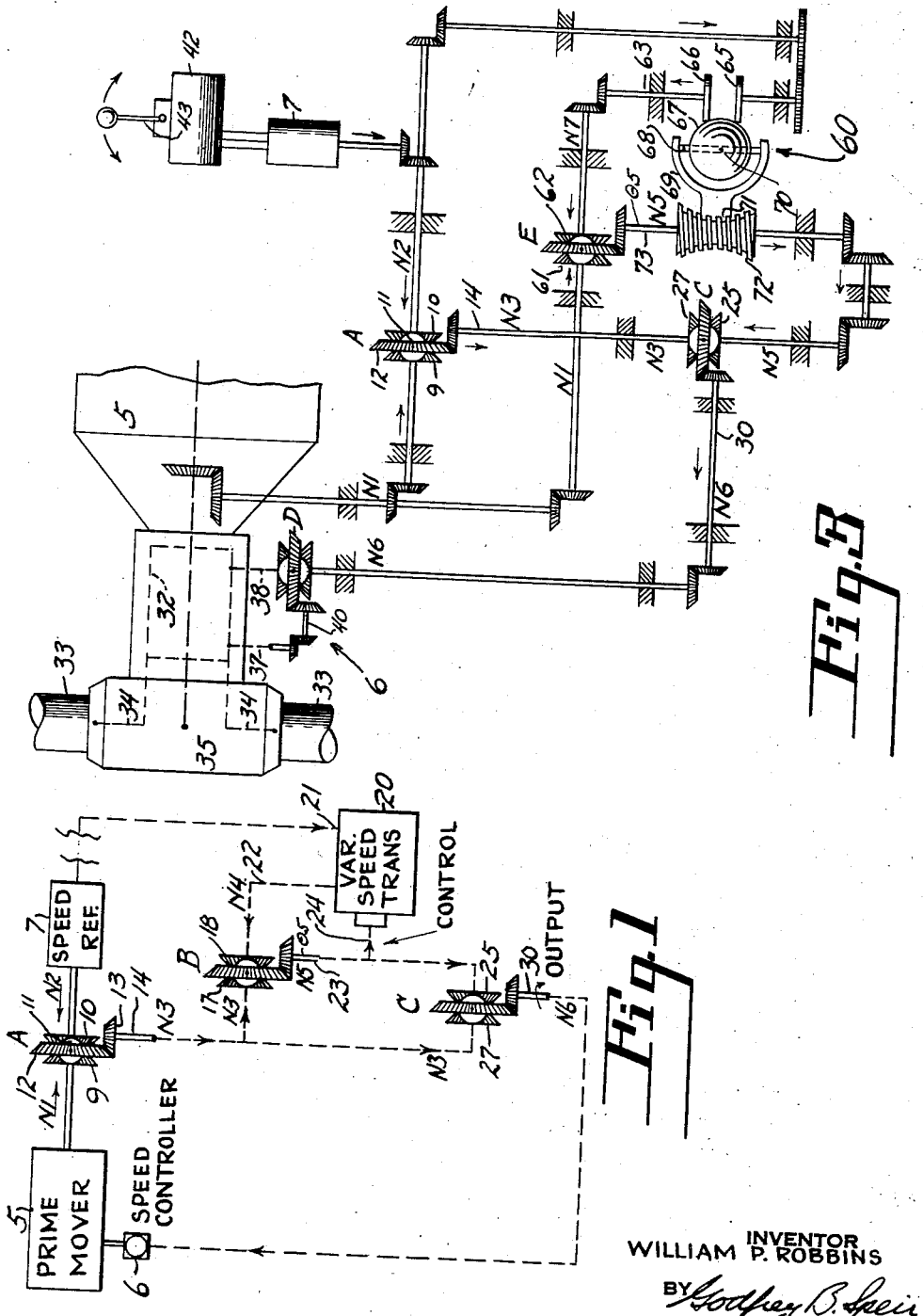
Figure 2:
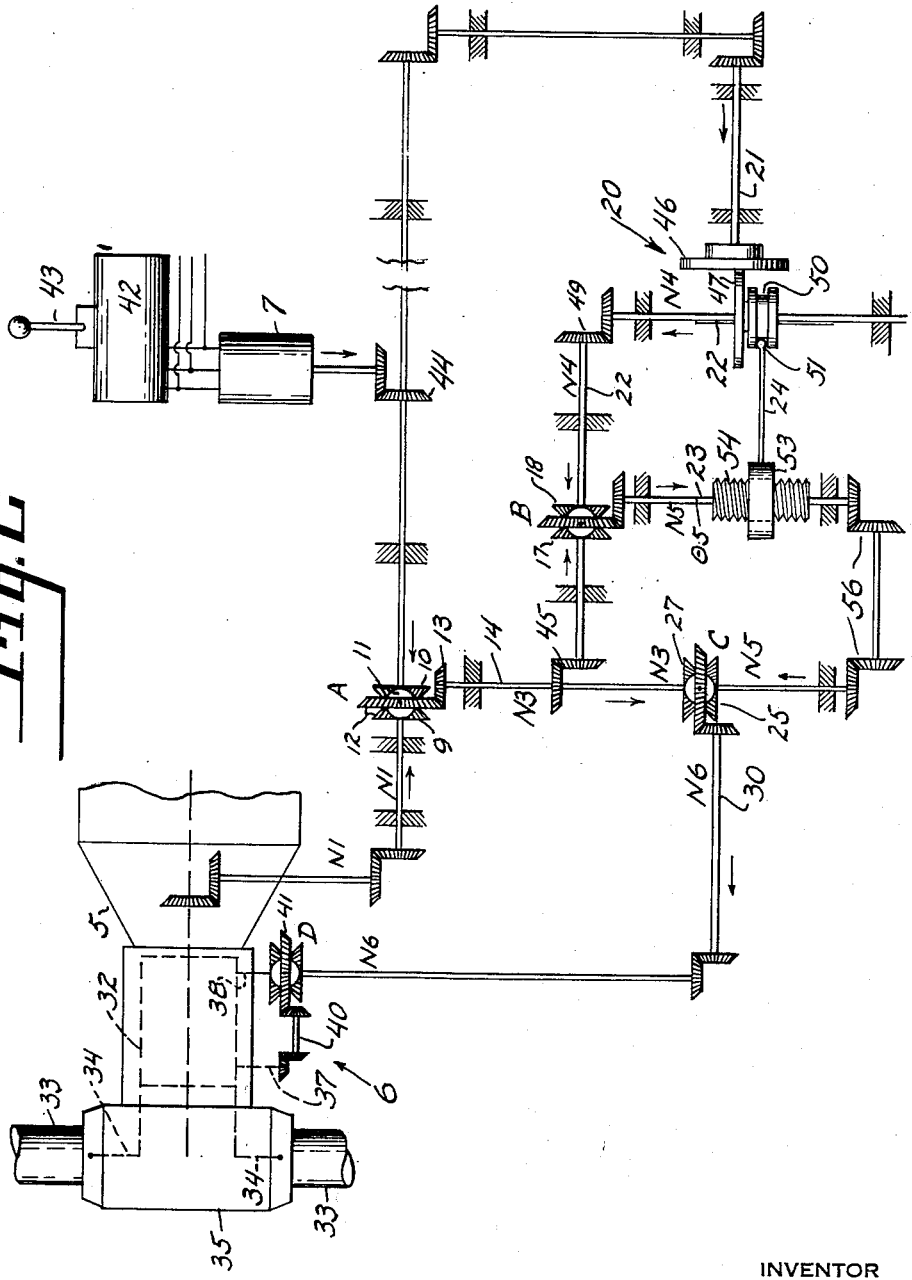

For a better understanding of the invention, reference may be made to the drawings in which Fig. 1 is a simplified schematic diagram of the invention;

Fig. 2 is a schematic diagram of an arrangement of the invention similar to Fig. 1 applied to the control of an aircraft power plant embodying a controllable pitch propeller; and Fig. 3 is a schematic diagram applied to a propeller equipped aeronautical power plant showing an alternative arrangement of the invention.

Referring first to Fig. 1, a prime mover is indicated at 5, this being equipped with a speed controller 6 which may be adjusted in position to correct the speed of the power plant which so far as the control system is concerned is represented at N1 which is proportional to power plant speed. In order to hold the prime mover to a constant desired speed of operation, a speed reference device 7 is provided, the speed reference comprising, for instance, a small constant speed electric motor, such as a synchronous A. C. motor energized by a constant frequency source. The reference speed is indicated at N2. A bevel gear differential is shown at A comprising a face gear 9 driven by the prime mover at speed N1 and a face gear 10 driven by the speed reference 7 at speed N2. Between the two face gears is a spider carrying differential pinions 11, the spider being provided with an output gear 12 which may be a bevel gear, meshed with a pinion 13 having an output shaft 14 which is driven at a speed N3. If N1 and N2 are the same but opposite in sense, the spider pinions 11 will spin on their own axes without rotating the spider gear 12 whereupon the shaft 14 will have zero rotation and consequently speed N3 is zero. If N1 and N2 are different, representing a speed error between the prime mover 5 and the speed reference 7, N3 will be proportional to the difference between N1 and N2.

A second differential B, similar in construction to the differential A, includes a face gear 17 driven at speed proportional to N3 by the shaft 14 and further includes a face gear 18 driven at a speed N4 which is produced by modifying some substantially constant speed through a variable speed transmission 20. A suitable drive for the shaft 21 may be from the speed reference 7, from the prime mover 5 or from some other source. The input shaft of the variable speed transmission is represented at 21 while its output shaft 22 is connected to the gear 18.

The differential B has an output shaft 23 rotating at a speed N5 which is proportional to the algebraic sum of the speeds N3 and N4. The shaft 23 is utilized to control the ratio of the variable speed transmission 20 between 1:>0; 1:0 and 1:<0, through a ratio controller 24 and is also utilized to drive a face gear 25 of a third mechanical differential C similar in construction to the differential A. The other face gear 27 of the differential 26 is driven at a speed proportional to N3 from the output shaft 14 of the differential A. The variable speed transmission 20 is of the type having zero speed output, regardless of input speed, when the ratio controller 24 is in the neutral position and has the further characteristic of rotating or moving the transmission output 22 in a positive or negative direction depending upon the direction of movement of the ratio controller 24 of the transmission. An output element 30 for the differential C moves proportionally to the algebraic sum of N3 and N5 and provides the adjustment signal which is applied directly to the prime mover speed controller 6. While gear differentials A, B and C have been shown and described, it is considered that other forms of differential mechanisms may be used, such as friction contact devices, lever linkages, or hydraulic or electrical differential devices.

The operation of the system is as follows: Should there be a speed error between N1 and N2, N3 will be proportional to the R. P. M. difference between N1 and N2. This, as noted, is applied directly to one side of the differential C and provides one component of the speed error correction which is required. The gear 17 of differential B will rotate in accordance with the speed error, the speed N4, the output from the variable speed transmission, being initially zero. Thus, the output element of the differential B will rotate at a speed N5 which is initially proportional to N3, which is applied to vary the ratio of the transmission 20 and also is applied to the gear 25 of the differential C wherein the two errors N3 and N5 are algebraically added to produce a corrective movement on the speed controller C in a direct and positive manner. A finite rotation $\theta 5$ of the shaft 23 serves immediately to initiate adjustment of the variable speed transmission 20 in a direction to make N4 equal N3 whereby N5 will be restored to zero; however, shaft 23 will be displaced $\theta 5$ degrees. As the speed correction progresses, the speed error N3 will diminish whereby the shaft 23 will change in position and speed, readjusting the transmission 20 to hold N4 to equal N3, and will thus impose on the gear 25 of the differential C a continually changing signal at speed N5 which represents the rate of change of speed error. It should be noted that N5 is the derivative of $\theta 5$ or symbolically is $$\frac{d\theta}{dt}$$

since $\theta = K(N1-N2)$ then $$N5 = \frac{d\theta}{dt} = \frac{Kd(N1-N2)}{dt} = \text{rate of change of speed error}$$

Since N3 is imposed on the gear 27 of the differential C, N5 and N3 are algebraically added in the differential C to produce the control signal N6. In other words, the differential C is provided with two components of a speed error signal—the speed error itself and the acceleration or first derivative of speed error or the rate of change of speed error. Thus, the movement imposed on the speed controller 6 is at all times equal to the speed error proper plus the positive or negative acceleration of the system. By this arrangement, any speed error existing in the system will expeditiously be eliminated minimizing hunt, overshooting or undershooting.

It will be noted that the correction applied to the speed controller 6 is direct and positive, the power for operation being derived directly from the prime mover itself and from the speed reference, obviating any need for servo systems or extra power sources. In the system the various speeds N1 to N6 are adjusted by ratio gearing to produce appropriate displacements in the system, whereby actual motion represented by N6 is suitable to effect movement of the speed controller 6. The control elements proper may be consolidated into small space, through suitable design. For instance, a control unit in an aircraft power plant of large size has been designed to comprise a housing occupying a small space including the reference speed motor, the variable drive and several differentials.

Simplified equations of the general system above described, neglecting a brief time delay occurring in the acceleration term, are:

$$N3 = N1 - N2$$
$$\int N6 = \int K1 N3 + K2 N3$$
$$N6 = K1 N3 + K2 \frac{dN3}{dt}$$

wherein K1 is a constant of the ratio of the gearing from differential gear 13 to differential gear 27, and K2 is a constant of the ratio of gearing from differential gear 13 to differential gear 25, modified by the time lag of the variable speed transmission 20.

Reference may now be made to Fig. 2 which shows the type of system disclosed in Fig. 1 in detailed form and applied to the controllable pitch propeller of an aircraft power plant. Such a propeller acts as a variable driven load on a power plant and is used, as is well known in the art, to convert torque to thrust and to control power plant and propeller speed through variation in the pitch angle of the propeller blades. The propeller may be of any desired type but for the purpose of this invention is one which is known as a "Beta control" propeller. Herein, a pitch changing mechanism is indicated at 32 which drives propeller blades 33 through gearing 34, the blades 33 being mounted in hub 35 which is driven by the power plant 5. The pitch changing mechanism includes a pitch adjusting control 37 for increasing and decreasing blade pitch and a pitch indicator 38. The control 37 is connected through appropriately geared shafting 40 to the output element 41 of a differential D which may be similar to the differentials A, B and C previously described. The pitch indicator element 38 is connected to one of the side gears of the differential D, while the output element 30 of differential C is connected to the other side gear of differential D. For the moment, it may be assumed that the output element 30 of differential C is controllably rotated during operation to call for a specific blade angle for the propeller. Accordingly, rotation of the control side gear of the differential D will impart a pitch changing signal to the control 37 and the propeller will change pitch. As pitch change occurs, the pitch indicator 38 will rotate its side gear of the differential to neutralize the pitch change as the correction called for is attained; when the propeller has reached the correct position as called for by the element 30, the output 41 of the differential D will be neutralized and no further pitch change will be called for until a new signal is delivered by the element 30.

The speed reference 7 in this embodiment preferably is a three-phase alternating current motor which is energized from a three-phase A. C. generator 42, said generator including a driving means and a speed adjuster 43 whereby any desired reference speed may be set up. Since the motor 7 is synchronous, it will run at whatever constant speed is represented by the output frequency of the generator. The motor 7 rotates gearing 44 which is coupled to one side gear 10 of differential A, the other side gear 9 of this differential being driven at a speed N1 proportional to engine speed. The output 14 of the differential A runs at the speed difference N3 between N1 and N2. N3 is applied through suitable gearing 45 to side gear 17 of differential B.

The variable speed transmission 20 in this embodiment comprises a face plate 46 driven from the input 21 at some more or less constant speed, driving power being taken either from the speed reference motor 7 through appropriate gearing, from the power plant 5, or from some other suitable motor arrangement. The variable speed device 20 further comprises a wheel 47 whose rim frictionally engages the plate 46, the wheel being movable bodily across the plate. The wheel 47 driven at times by the plate 46, may drive the shaft 22 which is connected by suitable gearing 49 to the other face gear 18 of the differential B. Movement of the wheel 47 along the shaft 22, upon which the wheel is keyed, may be accomplished by a grooved collar 50, the groove being engaged by a yoke element 51, forming part of the variable speed device control previously referred to as 24. In this case, the rod 24 is secured to a nut 53 axially movable along a screw 54 which is rotated at times in either direction by the output 23, at a speed N5, of the differential B. Under on-speed conditions, the shaft 23 will be stationary, and the screw 54 will center the wheel 47 on the plate 46 so that no rotation will be imparted to the shaft 22. When an off-speed occurs, the shaft 23 will rotate at a speed N5 which, initially is proportional to N3. Thereby, the wheel 47 is shifted to one or the other side of the center of the plate 46, driving the shaft 22 and thus, one side of the differential B, in a direction opposite to the rotational direction of the other input to the differential B, tending to stop rotation of the shaft 23. The variable speed transmission 20 will then hunt for a ratio to hold the shaft 23 stationary as N3 varies and in so hunting, the shaft 23 will be displaced rotationally in either direction, this angular displacement noted as $\theta 5$ being proportional to the positive or negative amount of the speed error, or in synonomous terms, N5 is proportional to the acceleration of the speed error and consequently of the power plant 5. The acceleration signal from the shaft 23 is applied, through suitable gearing 56, to one side gear 25 of a differential C, the other side gear 27 of which is directly connected to the output of the differential A whereby it rotates in accordance with the speed error N3. The differential C algebraically adds the two signals N3 and N5, respectively representing the speed error and the acceleration of the speed error whereby the output of the differential C, the shaft 30 running at speed N6, is proportional to the specific rate of change of blade angle required in the propeller to bring the power plant to an on-speed condition. The actual blade angle change is proportional to the integral of N6 with respect to time.

Fig. 3 shows an alternative control system based upon the general principles heretofore described wherein a different arrangement of variable speed transmission is utilized to secure the stabilizing acceleration signal which is applied to the "Beta control" propeller. Many of the elements in Fig. 3 are similar to those utilized in the previously described embodiments and bear similar reference characters. The essential difference is in a variable speed transmission 60 which under normal on-speed conditions has a drive ratio of 1:1 rather than 1:0, the transmission being capable of variation from 1:<1 to 1:>1 and being driven at a speed N2. A differential E is substituted for the differential B previously described wherein one side gear 61 is driven at speed N1 proportional to power plant speed and wherein the other side gear 62 is driven oppositely to the first at speed N7 by the output element 63 of the variable speed transmission 60 which under on-speed conditions is the same as N1. The output of differential E is proportional to the acceleration of speed error and rotates at N5 in similar fashion to the output of the differential B in the prior embodiments.

The transmission may be of any suitable type but as shown, comprises two coaxial wheels 65 and 66 which frictionally engage the surface of a ball 67. The driving wheel 65 is driven by the reference speed motor 7. Alternatively, the wheel 65 may be driven at engine speed providing the side gear 61 of the differential E is driven at reference speed. The ball is journalled for free rotation about an axle 68 carried by a yoke 69 which may be swung, in the plane of the drawing, about a center 70. The yoke includes a toothed portion 71 which engages a screw shaft 72 so that as the screw 72 rotates with the output 73 of the differential E, the ball axis 68 is swung clockwise or counterclockwise about the center 70 from the position shown. The transmission as shown is adjusted for 1:1 ratio since the diameters of those portions of the ball 67 which engage the wheels 65 and 66 are the same. If the ball axis 68 is tilted counter-clockwise about the center 70, the effective diameter of the ball portion engaging the wheel 65 is smaller than the effective diameter of the ball portion engaging the wheel 66 and consequently an overdrive will result, rotating the shaft 63 faster than the rotation of the input wheel 65. If the ball axis 68 is tilted clockwise, an underdrive will result, whereby rotation of the shaft 63 will be less than that of the wheel 65. The gearing is so arranged in respect to ratio that the side gear 62 will rotate at equal and opposite speed to the side gear 61 of the differential E when no speed error exists and when the transmission 60 is at 1:1 ratio. Upon existence of a speed error, speed N1 feeding the gear 61 and N7 feeding the gear 62 will differ and the output 73 of the differential E will rotate at N5, shifting the transmission ratio in a direction to equalize speeds N1 and N7 to stop rotation of the shaft 73. The rotation N5 of the shaft 73 and its position thus represents the acceleration component of the speed error and is applied to the side gear 25 of the differential C. This is algebraically added to the rotation N3 from differential A so that the output of differential C, N6, at the shaft 30, constitutes the algebraic sum of the speed error and of the acceleration of the speed error, this signal being applied to the propeller through the "Beta control" differential D, in the same manner as previously described.

The end result of the systems of Figs. 2 and 3 is the same; the number of mechanical components for both arrangements is substantially the same. A slight advantage may flow from the arrangement of Fig. 3 in that the variable ratio transmission device 60 drives at all times and has no inactive regions. The transmission 20 of Fig. 2, has zero output at on-speed, under which condition there is non-driving scrubbing between the driving plate 46 and on point on the rim of the driven wheel 47 of the transmission. However, other types of normally 1:0 variable drives may be substituted in the system of Fig. 2 so that both systems of Figs. 2 and 3 are practicable.

It may be noted in the embodiment of Figs. 1 and 2 that the drive for the input to the transmission 20 has been mentioned as being alternative. That is, it may be driven at engine speed, at reference speed, or at some other relatively constant speed. Since the ratio of the transmission under equilibrium conditions is 1:0, the source of drive for it is unimportant. In the embodiment of Fig. 3, on the other hand, the transmission is at 1:1 ratio when the system is in equilibrium so that it must be driven (1) by the constant speed source when the gear 61 of the differential E is driven by the engine or (2) by the engine when the gear 61 of differential E is driven by the constant speed source.

In both of the systems described, positive control signals having great power are provided without the utilization of servo mechanisms. The stiffness of the control provided is essentially dependent upon the power available from the speed reference 7. Available power for intermittent operation may be increased in a small speed reference motor by the use of a flywheel in the motor which will reduce the R. P. M. drop of the motor upon sudden and transient control demands. Actually, a slight transient slow-down of the speed reference 7 offers no disadvantage since this deceleration provides a recoverable droop in the speed control system further tending to stabilize the system. With a properly designed system according to the invention, this droop may be minimized or accentuated according to requirements; it is generally unnecessary in view of the fact that the system is acceleration stabilized through the variable ratio transmission and the arrangement of the several differentials.

In the drawings the systems are schematic in character and do not represent a specific or desirable detailed design. Consolidation of the various elements of the system into a compact and effective physical arrangement is deemed to lie within the realm of the skilled designer. Fail-safe and other control devices may readily be incorporated in the systems disclosed. For instance, protection against failure of the speed reference may be secured by locking the output shaft 30 in the event of failure of any part of the speed reference devices 7 and 42. Manual overcontrol may likewise be incorporated in the system by providing a disconnect in the output 30 so that blade pitch angle may be manually established for the purpose of operating in fixed pitch at any desired angle including feathering or reverse.

Though several embodiments illustrating the invention have been shown and described, it is to be understood that the invention may be applied in other and various forms. Changes may be made in the arrangements, without departing from the spirit of the invention. Reference should be had to the appended claims for definitions of the limits of the invention.

What is claimed is:

1. In a speed control for a rotating member subject to speed variations, including an element to adjust member speed, a reference speed source, differential means directly connected to said member and reference to compare reference and member speeds and including a variable ratio transmission mechanism to produce a signal proportional to the rate of change of speed error of the member, second differential means directly connected to said member and reference to compare the reference and member speeds and to produce a signal proportional to the speed error, third differential means directly connected to said first and second differential means to add said two signals algebraically, and means directly connected to said third differential means to operate said speed adjusting element according to the added signals.

2. In a speed control system for a rotating member of a power plant, including a control member whose position is adjustable to control the speed, a rotating shaft whose speed is proportional to that of said rotating member and which is connected to and driven by said rotating member, a second shaft rotating at substantially constant speed, a differential having two input elements respectively connected to and driven by said first and second shafts in opposite directions and an output element driven by the two input elements at a speed and direction representing the speed difference thereof; a second differential having an input element connected to and driven by the output element of the first differential, said second differential having an output element connected to and driving said control member, and said second differential having another input member; a take-off connected to the output element of the first differential, means connected to said take-off to measure the rate of change of the taken off signal, and means driven by said connected means and connected to rotate said other input member of the second differential in accordance with the measured rate of change of said taken off signal.

3. In a speed control for a rotating member subject to speed variations, including an element to adjust member speed; a differential device having two inputs and an output, the output representing the algebraic sum of the inputs, one input being connected to a reference speed source and the other input at opposite sign to the member whereby the output represents the speed difference therebetween; a second differential device having two inputs and an output, one input being connected responsively to the member speed, a variable ratio mechanism having an input driven at substantially constant speed and an output connected to the other input of said second differential device; the output of said second differential device being connected to said variable ratio mechanism to adjust its ratio; a third differential device having two inputs and an output, the inputs being connected respectively to the outputs of the two differential devices; and means for controlling said member speed adjusting element connected to and actuated by the output of said third differential device.

4. In a speed control for a member, speed changing mechanism for the member including an input element therefor adjustable to call for specific member operating speeds, a selectively constant speed device to provide a speed reference, means connected to the device and member to compare the reference and member speed including an output shaft rotatable at a speed proportional to the speed error between reference and member speed, means connected to said member movable in response to the rate of change of speed error and comprising a variable ratio speed changer whose ratio is changed according to the speed error, means connected to said comparing means and to said rate of change means comprising a movable output member which adds the speed error and the rate of change of the speed error, and means coupling said output member with the input element of said speed changing mechanism.

5. In a speed control for a rotating member subject to speed variations, including an element to adjust member speed; a reference speed source; a three-element differential having one element connected to and driven by the member and a second by the reference speed source, the third element being thereby constrained to move in accordance with the speed error between the member and source, a variable speed source, means to control the speed thereof in accordance with the rate of change of speed error; another three-element differential having two input elements respectively drivably connected to the member and to said variable speed source and an output element whose movement is controlled by said member and variable speed source and is proportional to rate of change of the speed error; and a third three-element differential having two input elements connected to and driven by the output elements of the first two differentials, the third differential algebraically adding said outputs and producing an output representing the sum of the speed error and the rate of change of speed error, and means connecting said latter output to said member speed adjusting element.

6. In a speed control for a rotating member subject to speed variations, including an element to adjust member speed; a reference speed source; a three-element differential having two input elements connected to and driven by the member and reference speed source respectively and an output element constrained to move in accordance with the speed error between the member and source; a second three-element differential having two input elements, one connected to the rotating member driven at a function of member speed; a variable ratio drive having an input driven at a substantially constant speed and an output connected to and driving the other input of the second differential, means connected to vary the ratio of said drive in response to movement of the third output element of said second differential; a third three-element differential having inputs connected to and driven by the outputs of the other two differentials respectively, the output of said third differential being connected to said member speed adjusting element to adjust member speed and producing a signal proportional to the sum of the speed error and the rate of change of speed error.

7. In a speed control for a rotating member subject to speed variations including a member speed adjuster for the member, a three-element differential, a reference speed source connected to and driving one element of the differential, another element of the differential being connected to and driven by the member, the movement of the third differential element being proportional to the speed error between the member and the reference source, a variable ratio drive mechanism having a substantially constant input speed, the mechanism including an output having a neutral zero speed output and output speeds in opposite directions, means to adjust the ratio of said mechanism; a second three-element differential having an element connected to and driven by the output element of the first differential, an element connected to and driven by the output of said variable drive, and an output element connected to and driving the ratio adjusting means; and a third three-element differential having elements connected to and driven respectively by the third element of the first differential and by the output element of the second differential, and means connected to and driven by the third element of the third differential for moving said member speed adjuster.

8. In a speed control for a rotating member subject to speed variations including a speed adjuster for the member, a three-element differential, a reference speed source connected to and driving one element of the differential, another element of the differential being connected to and driven by the member, the movement of the third output element of the differential being proportional to the speed error between the member and the reference source, a variable ratio drive mechanism having a substantially constant input speed corresponding to reference speed, an output having a neutral output speed at 1:1 ratio with the input and having greater than and less than 1:1 ratio, means to adjust the ratio of said mechanism; a second three-element differential having an element connected to and driven by the member, an element connected to and driven by the output of the variable ratio drive mechanism, and an output element connected to and driving the ratio adjusting means; and a third three-element differential having an element connected to and driven by the first differential output element, an element connected to and driven by the second differential output element, and an output element connected to and driving the member speed adjuster.

9. In a speed control for a rotating member subject to speed variations including a speed adjuster for the member, a reference speed source, a first three-element differential having one input connected to and driven by the member and another input connected to and driven by the source and including an output; a second three-element differential including an output and two input elements; a variable speed drive including a ratio adjuster, an output and an input element, means connecting the output of said variable drive to one of the input elements of said second differential, one of said remaining input elements being drivably connected to said member and the other of said remaining input elements being drivably connected to said reference source; said second differential having its said output connected to said variable drive ratio adjuster for actuation thereof, and means connected to said output element of said first differential and to said output element of said second differential to sum the signals therefrom, said last means being connected to said member speed adjuster to position same according to the combined outputs fed to said means.

10. In a speed control for a rotating member subject to speed variations including a speed adjuster for the member, a reference speed source; an assembly comprising two inputs one connected to and driven by said member and the other connected to and driven by said reference speed source, said assembly further comprising a first three-element differential to one element of which one of said inputs is connected, a variable ratio drive having a driving end and a driven end to the driven end of which the other of said inputs is connected, a driving connection between the driving end of said variable ratio drive and a second element of said differential, said variable ratio drive having a ratio adjuster, an operating connection from the third output element of said differential to said ratio adjuster, and an operating connection from the third output element of said differential to said member speed adjuster.

11. In a speed control for a rotating member subject to speed variations including a speed adjuster for the member, a reference speed source; and assembly comprising two inputs one connected to and driven by said member and the other connected to and driven by said reference speed source, said assembly further comprising a first three-element differential to one element of which one of said inputs is connected, a variable ratio drive having a driving end and a driven end to the driven end of which the other of said inputs is connected, a driving connection between the driving end of said variable ratio drive and a second element of said differential, said variable ratio drive having a ratio adjuster, an operating connection from the third output element of said differential to said ratio adjuster, a second three-element differential having an input connected to said member, an input connected to said reference speed source, and an output element, and means connecting the output elements of said first and second differentials to said member speed adjuster.

12. In a speed control for a rotating member subject to speed variations including a speed adjuster for the member, a reference speed source; an assembly comprising two inputs one connected to and driven by said member and the other connected to and driven by said reference speed source, said assembly further comprising a first three-element differential to one element of which one of said inputs is connected, a variable ratio drive having a driving end and a driven end to the driven end of which the other of said inputs is connected, a driving connection between the driving end of said variable ratio drive and a second element of said differential, said variable ratio drive having a ratio adjuster, an operating connection from the third output element of said differential to said ratio adjuster, a second three-element differential having an input connected to said member, an input connected to said reference speed source, and an output element, a third three-element differential having inputs respectively connected to the output elements of said first and second differentials, and an output from said third differential operatively connected to said member speed adjuster.

13. In a speed control for a rotating member, a reference speed source, a speed adjuster for the member, first means connected to the member and source to sense the speed difference therebetween and having an output element producing a speed error signal, second means connected to and driven by said first means and comprising a variable ratio transmission to derive the rate of change of speed and having an output element producing a rate of change of speed signal, and third means driven by said first and second means and connected to the output elements thereof, said third means summing said speed error and rate of change of speed signals and having an output representing the summed signals, and an operating connection from said last output to said member speed adjuster.

14. In a speed control for a rotating member, a reference speed source, a speed adjuster for the member, first means connected to the member and source to sense the speed difference therebetween and having an output element producing a speed error signal, second means connected to and driven by said member and source including mechanism to derive the rate of change of speed of the member and having an output element producing a rate of change of speed signal, and third means driven by said first and second means and connected to the output elements thereof, said third means summing said speed signals and having an output representing the summed signals, and a connection from said last output to said member speed adjuster.

WILLIAM P. ROBBINS.

References Cited in the file of this patent
UNITED STATES PATENTS

| Number | Name | Date |
| --- | --- | --- |
| 2,149,785 | Neugebauer | Mar. 7, 1939 |
| 2,251,388 | Bates | Aug. 5, 1941 |
| 2,346,856 | Martin | Apr. 18, 1944 |
| 2,358,894 | Volet | Sept. 26, 1944 |
| 2,399,685 | McCoy | May 7, 1946 |
| 2,456,747 | Snader et al. | Dec. 21, 1948 |
| 2,494,092 | Hayward | Jan. 10, 1950 |
| 2,551,502 | Montrose-Oster | May 1, 1951 |
| 2,595,195 | Hosterman, Jr. | Apr. 29, 1952 |